United States Patent [19]

Carpenter

[11] 4,268,083
[45] May 19, 1981

[54] UNIVERSAL CARRIER ATTACHMENT FOR PICK-UP VANS

[76] Inventor: Donald C. Carpenter, 1730 Audrey Dr., Clearwater, Fla. 33519

[21] Appl. No.: 954,926

[22] Filed: Oct. 26, 1978

[51] Int. Cl.³ .............................................. B60P 3/42
[52] U.S. Cl. ..................................... 296/10; 296/35.3
[58] Field of Search ............... 296/10, 164, 167, 35 A, 296/35 B

[56] References Cited

U.S. PATENT DOCUMENTS

| | | | |
|---|---|---|---|
| 2,559,029 | 7/1951 | Randolph | 296/164 |
| 2,788,238 | 4/1957 | Baird | 296/164 |
| 3,995,890 | 12/1976 | Fletcher | 296/10 |

Primary Examiner—Robert R. Song
Attorney, Agent, or Firm—Jones, Tullar & Cooper

[57] ABSTRACT

A universal carrier attachment for pick-up vans is disclosed which may be readily mounted or dismounted from the cargo compartment of a pick-up van without requiring permanent fasteners. In one embodiment, the carrier includes a horizontal platform fitted within the cargo compartment, having first and second opposed vertical walls on which are mounted first and second horizontal lips, respectively. The horizontal lips rest on the top surfaces of the sidewalls of the cargo compartment and support the vertical wall and platform of the carrier so as to depend downwardly from the horizontal lips into the cargo compartment. The tailgate for the pick-up van then mechanically contacts the rear edge of the platform for the carrier when the tailgate is in its closed position so that the carrier is held in position in the cargo compartment and yet may be readily dismounted by merely lowering the tailgate and sliding the carrier out of the cargo compartment. In this manner, the carrier is held in position over the cargo compartment when the tailgate of the pick-up van is closed so as to mechanically contact the rear edge of the carrier assembly, permitting the carrier to be readily dismounted by merely lowering the tailgate and sliding the carrier off the top of the cargo compartment. In another alternate embodiment, a first horizontal dowel protruding from the forward portion of the carrier can slip into a perforation in the front wall of the cargo compartment and a second horizontal dowel in the rear portion of the carrier can slip into a perforation in the tailgate of the van to further secure the assembly.

1 Claim, 6 Drawing Figures

U.S. Patent   May 19, 1981   4,268,083
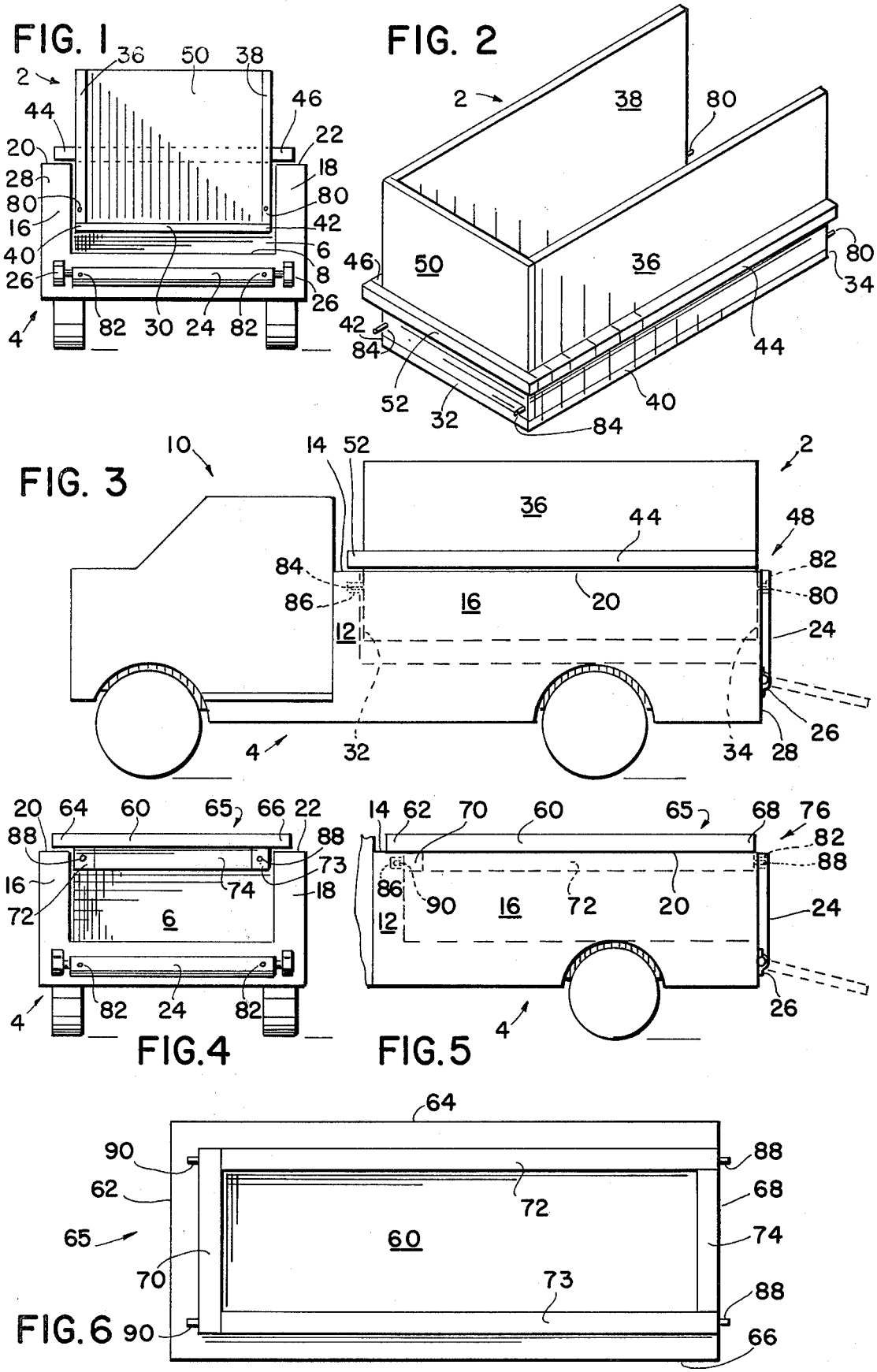

UNIVERSAL CARRIER ATTACHMENT FOR PICK-UP VANS

FIELD OF THE INVENTION

The invention disclosed broadly relates to attachments for a motor vehicle and more particularly relates to a carrier attachment for a pick-up van.

BACKGROUND OF THE INVENTION

The pick-up truck has become a popular mode for carrying small cargos. Carrier attachments have been developed to adapt the pick-up truck to particular hauling applications, including the provision of cabinets for carrying the tools of a workman and long racks to carry pipes and ducting. Prior art designs for such pick-up van carriers have required permanent fasteners to bolt or clamp the carrier to the cargo compartment of the pick-up van. This has limited the versatility in use of the pick-up van since the operator must laboriously detach the specialized carrier before applying his pick-up van to an application to which the carrier is unsuitable.

OBJECTS OF THE INVENTION

It is therefore an object of the invention to provide an improved carrier for a pick-up van.

It is still another object of the invention to provide an improved carrier for a pick-up van which is easily mounted and detached from the cargo compartment.

It is yet a further object of the invention to provide an improved carrier for a pick-up van which is clamped into position in the cargo compartment in an improved manner.

SUMMARY OF THE INVENTION

These and other objects, features and advantages of the invention are accomplished by the universal carrier attachment for pick-up vans disclosed herein. A universal carrier attachment for pick-up vans is disclosed which may be readily mounted or dismounted from the cargo compartment of a pick-up van without requiring permanent fasteners. In one embodiment, the carrier includes a horizontal platform fitted within the cargo compartment, having first and second opposed vertical walls on which are mounted first and second horizontal lips, respectively. The horizontal lips rest on the top surfaces of the sidewalls of the cargo compartment and support the vertical wall and platform of the carrier so as to depend downwardly from the horizontal lips into the cargo compartment. The tailgate for the pick-up van then mechanically contacts the rear edge of the platform for the carrier when the tailgate is in its closed position so that the carrier is held in position in the cargo compartment and yet may be readily dismounted by merely lowering the tailgate and sliding the carrier out of the cargo compartment. In a second embodiment of the invention, the carrier is a horizontal platform which rests on top of the sidewalls for the cargo compartment of the pick-up van. Horizontal lips depend from the underside of the platform along the inside edges of the sidewalls for the cargo compartment to provide lateral support for the platform. In this manner, the carrier is held in position over the cargo compartment when the tailgate of the pick-up van is closed so as to mechanically contact the rear edge of the carrier assembly, permitting the carrier to be readily dismounted by merely lowering the tailgate and sliding the carrier off the top of the cargo compartment. In another alternate embodiment, a first horizontal dowel protruding from the forward portion of the carrier can slip into a perforation in the front wall of the cargo compartment and a second horizontal dowel in the rear portion of the carrier can slip into a perforation in the tailgate of the van to further secure the assembly.

DESCRIPTION OF THE FIGURES

These and other objects, features and advantages of the invention will be more fully appreciated with reference to the accompanying figures.

FIG. 1 is a rear view of a universal carrier attachment for pick-up vans as it appears in a pick-up van, with the tailgate open.

FIG. 2 is an isometric view of a first embodiment of the universal carrier attachment for pick-up vans.

FIG. 3 is a side view of the first embodiment of the universal carrier attachment for pick-up vans as it appears mounted in a pick-up van with the tailgate closed.

FIG. 4 is a rear view of an alternate embodiment of the universal carrier attachment for pick-up vans, as it appears mounted in a pick-up van.

FIG. 5 is a side view of the alternate embodiment of the universal carrier attachment for a pick-up van with the tailgate closed.

FIG. 6 is a bottom view of the alternate embodiment of the universal carrier attachment for a pick-up van.

DISCUSSION OF THE PREFERRED EMBODIMENT:

A universal carrier attachment for pick-up vans is disclosed which may be readily mounted or dismounted from the cargo compartment of a pick-up van without requiring permanent fasteners. In one embodiment, the carrier includes a horizontal platform fitted within the cargo compartment, having first and second opposed vertical walls on which are mounted first and second horizontal lips, respectively. The horizontal lips rest on the top surfaces of the sidewalls of the cargo compartment and support the vertical wall and platform of the carrier so as to depend downwardly from the horizontal lips into the cargo compartment. The tailgate for the pick-up van then mechanically contacts the rear edge of the platform for the carrier when the tailgate is in its closed position so that the carrier is held in position in the cargo compartment and yet may be readily dismounted by merely lowering the tailgate and sliding the carrier out of the cargo compartment. In a second embodiment of the invention, the carrier is a horizontal platform which rests on top of the sidewalls for the cargo compartment of the pick-up van. Horizontal lips depend from the underside of the platform along the inside edges of the sidewalls for the cargo compartment to provide lateral support for the platform. In this manner, the carrier is held in position over the cargo compartment when the tailgate of the pick-up van is closed so as to mechanically contact the rear edge of the carrier assembly, permitting the carrier to be readily dismounted by merely lowering the tailgate and sliding the carrier off the top of the cargo compartment. In another alternate embodiment, a first horizontal dowel protruding from the forward portion of the carrier can slip into a perforation in the front wall of the cargo compartment and a second horizontal dowel in the rear portion of the carrier can slip into a perforation in the tailgate of the van to further secure the assembly.

Reference to FIGS. 1, 2 and 3 illustrate a first embodiment of the carrier attachment for pick-up vans. The pick-up van 4 has a cargo compartment 6 including a horizontal bed 8 located behind the driver's cab 10. The cargo compartment 6 is bounded on three sides by a front wall 12 having a top surface 14 and a first side wall 16 and a second opposed side wall 18 having top surfaces 20 and 22, respectively. A vertically swinging tailgate 24 is mounted at its bottom on opposite ends by a pivot mount 26 on the rearward end 28 of the first side wall 16 and the second side wall 18 of the cargo compartment. The tailgate 24 forms a fourth side of the cargo compartment 6 when in a closed position.

The carrier attachment 2 includes a horizontal platform 30 fitted within the cargo compartment 6, having a front edge 32 adjacent to the front wall 14 of the cargo compartment and a rear edge 34 adjacent to the tailgate 24, when closed.

A first vertical wall 36 and second opposed wall 38 are mounted along opposed edges 40 and 42 of the platform 30 and are adjacent to the first sidewall 16 and a second sidewall 18 of the cargo compartment, respectively.

A first horizontal lip 44 is mounted to the outside of the first vertical wall 36 and rests on the top surface 20 of the first sidewall 16 of the pick-up van's cargo compartment. This first lip 44 supports the first vertical wall 56 and the platform 30 so as to depend downwardly from the first lip 44 into the cargo compartment 6.

A second horizontal lip 46 is mounted to the outside of the second vertical wall 38 and rests on the top surface 22 of the second sidewall 18 of the pick-up van's cargo compartment. The second horizontal lip 46 supports second vertical wall 38 and platform 30 so as to depend downwardly from the second lip 46 into the cargo compartment 6.

The tailgate 24 mechanically contacts at point 48 the rear edge 34 of the platform 30 when the tailgate is in its closed position. In this manner, the carrier 2 is held in position in the cargo compartment 6 without the requirement of permanent mechanical fasteners. This enables the carrier to be readily removed from the cargo compartment by merely lowering the tailgate 24 and sliding the carrier off the top of the sidewalls for the cargo compartment of the pick-up van.

The carrier attachment 2 may further include a forward vertical wall 50 mounted to the front edge 32 of the platform 30 which is adjacent to the front wall 12 of the cargo compartment for the pick-up van. A forward lip 52 is mounted to the outside of the forward vertical wall 50 and rests on the top surface 14 of the front wall 12 of a cargo compartment for the pick-up van. The forward lip 52 supports the forward vertical wall 50 and the platform 30 so as to depend downwardly from the forward lip 52 into the cargo compartment 6.

In an alternate embodiment of the invention, horizontal dowels 80 mounted on the rear edge of the vertical walls 36 and 38 or along the rear edge of the platform 30 can slide into mating perforations 82 in the tailgate 24 when it is closed. Horizontal dowels 84 mounted on the front edge of the vertical walls 36 and 38 or along the front edge of the platform 30 can slide into mating perforations 86 in the front wall 12 of the van when the carrier 2 is slid into place. The dowels 80 and 84 provide additional anchorage for the carrier 2 on the van 4.

A variety of modifications can be made to the carrier attachment 2 shown in FIGS. 1, 2 and 3 such as the inclusion of a roof and rear walls to fully enclose the carrier, forming an elevated cargo compartment. Cabinets may be included either above or below the platform 30 or attached above or to the outside of the horizontal lips 44 and 46. The height of the carrier 2 may be increased and extended forwardly over the top of the cab 10 to accommodate long pieces of cargo such as pipe or ducting.

The capability of readily removing the carrier 2 from the cargo compartment 6 of the pick-up van by merely lowering the tailgate 24 and sliding the carrier 2 out of the cargo compartment 6, lends greater versatility to the applications to which the pick-up van may be used.

An alternate embodiment of the invention is shown in FIGS. 4, 5 and 6. In this alternate embodiment, a horizontal platform 60 has a front edge 62 which overlaps and rests upon the top surface 14 of the front wall 12 of the cargo compartment 6 for the pick-up van 4. The horizontal platform 60 has a first side edge 64 which overlaps and rests upon the top surface 20 of the first sidewall 16 and a second side edge 66 which overlaps and rests upon the top surface 22 of the second sidewall 18. The horizontal platform 60 has a rear edge 68 which is adjacent to the tailgate 24 when the tailgate is in the closed position.

A forward lip 70 depends downwardly from the underside of the platform 60 along the front edge 62 and is adjacent to the inside surface of the front wall 12 of the cargo compartment for the pick-up van as to provide lateral support to the platform 60.

A first side lip 72 depends downwardly from the underside of the platform 60 along the first side edge 64 and is adjacent to the inside surface of the first sidewall 16 of the cargo compartment for the pick-up van. The first side lip 72 provides lateral support to the platform 60.

A second side lip 73 depends downwardly from the underside of the platform 60 along the second side edge 66 and is adjacent to the inside surface of the second sidewall 18 of the cargo compartment for the pick-up van, for providing lateral support to the platform 60.

A rear lip 74 depends downwardly from the underside of the platform 60 along the rear edge 68 and mechanically contacts at point 76 the inside surface of the tailgate 24 when the tailgate is at its closed position. This provides lateral support for the platform 60 and clamps the carrier 65 into position on top of the cargo compartment 6 of the pick-up van. In this manner, the carrier 65 does not require permanent mounting fasteners since it is clamped into position by the mechanical contact made by the tailgate 24 with the rear lip 74 when the tailgate is closed. By merely lowering the tailgate, the carrier 65 may be readily slid off the top of the cargo compartment 6 for the pick-up van to enable the pick-up van to apply to other uses.

In an alternate embodiment of the invention, horizontal dowels 88 mounted on the rear edge of the rear lip 74 can slide into the mating perforations 82 in the tailgate when it is closed. Horizontal dowels 90 mounted on the front edge of the forward lip 70 can slide into mating perforations 86 in the front wall 12 of the van when the carrier 65 is slid into place. The dowels 88 and 90 provide additional anchorage for the carrier 65 on the van 4.

The carrier 65 may be modified by including a fence structure above its forward edge 52 and along the side edges 64 and 66 and a fence or gate-like structure above its rear edge 68, if desired.

Although certain specific embodiments of the invention have been disclosed herein, workers of skill in the art will agree that other modifications may be made to the structure disclosed herein without departing from the spirit and scope of the invention.

What is claimed is:

1. A carrier attachment for a truck vehicle having a cargo compartment including a horizontal bed located behind a driver's cab, bounded on three sides by a front wall having a top surface and a first and second opposed side walls having top surfaces, with a vertically swinging, bottom mounted tail gate having opposite ends pivotally mounted on the rearward ends of said first and second side walls, respectively, forming a fourth side of said cargo compartment when in a closed position, comprising:

a horizontal platform fitted within said cargo compartment having a front edge adjacent to said front wall and a rear edge adjacent to said tail gate;

first and second opposed vertical walls mounted along opposed edges of said platform and adjacent to said first and second side walls, respectively;

a first horizontal lip mounted to the outside of said first vertical wall and resting on said top surface of said first side wall, for supporting said first vertical wall and said platform to depend downwardly from said first lip into said cargo compartment;

a second horizontal lip mounted to the outside of said second vertical wall and resting on said top surface of said second side wall, for supporting said second vertical wall and said platform to depend downwardly from said second lip into said cargo compartment;

said tail gate mechanically contacting said rear edge of said platform when in said closed position;

a forward vertical wall mounted to said front edge of said platform and adjacent to said front wall;

a forward lip mounted to the outside of said forward vertical wall and resting on said top surface of said front wall, for supporting said forward vertical wall and said platform to depend downwardly from said forward lip into said cargo compartment;

a first horizontal dowel mounted on said forward vertical wall of said carrier, proximate to said front wall of said cargo compartment;

said front wall of said cargo compartment having a perforation therein for mating engagement with said first horizontal dowel;

a second horizontal dowel mounted on a rearward edge of said first vertical wall of said carrier, proximate to said tail gate when closed;

said tail gate having a perforation therein for mating engagement with said second horizontal dowel when said tail gate is in said closed position;

whereby said carrier is secured to said cargo compartment.

* * * * *